US012585972B2

(12) United States Patent
Kassir et al.

(10) Patent No.: US 12,585,972 B2
(45) Date of Patent: Mar. 24, 2026

(54) FAST CONTROLLER DEVICE FOR CONTROLLING A QUANTUM PROCESSOR

(71) Applicant: ZURICH INSTRUMENTS AG, Zürich (CH)

(72) Inventors: Hussein Kassir, Zürich (CH); Niels Haandbaek, Zug (CH); Sadik Hafizovic, Zürich (CH)

(73) Assignee: ZURICH INSTRUMENTS AG, Zürich (CH)

( * ) Notice: Subject to any disclaimer, the term of this patent is extended or adjusted under 35 U.S.C. 154(b) by 687 days.

(21) Appl. No.: 17/927,448

(22) PCT Filed: May 26, 2020

(86) PCT No.: PCT/EP2020/064516
§ 371 (c)(1),
(2) Date: Nov. 23, 2022

(87) PCT Pub. No.: WO2021/239215
PCT Pub. Date: Dec. 2, 2021

(65) Prior Publication Data
US 2023/0177002 A1     Jun. 8, 2023

(51) Int. Cl.
G06N 10/40          (2022.01)
G06F 9/30          (2018.01)
(Continued)

(52) U.S. Cl.
CPC ......... G06N 10/40 (2022.01); G06F 9/30101 (2013.01); G06F 15/82 (2013.01); G06N 10/60 (2022.01)

(58) Field of Classification Search
CPC .... G06N 10/40; G06N 10/60; G06F 9/30101; G06F 15/82
See application file for complete search history.

(56) References Cited

U.S. PATENT DOCUMENTS

| 6,892,273 B1 | 5/2005 | James et al. |
| 8,035,540 B2 | 10/2011 | Berkley et al. |

(Continued)

OTHER PUBLICATIONS

C.A. Ryan et al., "Hardware for Dynamic Quantum Computing", arXiv:1704.08314v1, Apr. 28, 2017, pp. 1-13.

(Continued)

*Primary Examiner* — Daniel D Chang
(74) *Attorney, Agent, or Firm* — GREENBLUM & BERNSTEIN, P.L.C.

(57)          ABSTRACT

A system for controlling a quantum processor comprises a controller device having a plurality of input channels and output channels connected to qubit readout instruments and qubit control instruments. The controller device forms a register bank for receiving the data from the input channels, a feedback block for processing the data from the register bank, and an output interface for sending the results of the feedback block to the control instruments. For each input channel, the controller device comprises a mask generator with its own address decoder for processing the update messages on the input channels in parallel. Each update message comprises address data, data values for several registers and validity bits indicating if the data values are valid.

14 Claims, 3 Drawing Sheets

(51) Int. Cl.
    *G06F 15/82*     (2006.01)
    *G06N 10/60*     (2022.01)

(56)                References Cited

U.S. PATENT DOCUMENTS

| | | | |
|---|---|---|---|
| 11,726,790 B2 * | 8/2023 | Khammassi | G06F 7/5443 |
| | | | 706/62 |
| 2009/0010090 A1 | 1/2009 | Lloyd et al. | |
| 2016/0019161 A1 | 1/2016 | Patel et al. | |
| 2018/0260245 A1 | 9/2018 | Smith | |
| 2021/0313973 A1 * | 10/2021 | Cohen | G06N 3/04 |

OTHER PUBLICATIONS

P. Das et al., "A Scalable Decoder Micro-architecture for Fault-Tolerant Quantum Computing", arXiv:2001.06598v1, Jan. 18, 2020, pp. 1-19.

X.Fu et al., "eQASM: An Executable Quantum Instruction Set Architecture", ARXIV.1808.02449v2, Cornell University Library, 201 Olin Library Cornell University Ithaca, NY 14853, XP081183804, Aug. 9, 2018, pp. 1-13.

X. Fu et al., "eQASM: An Executable Quantum Instruction Set Architecture", ARXIV.1808.02449v3, Cornell University Library, 201 Olin Library Cornell University Ithaca, NY 14853, XP081183804, Mar. 9, 2019, pp. 1-14.

Vineeth Govind et al., "A Generic Synthesizable NoC Switch with a Scalable Testbench", Baltic Electronics Conference, 2006 International, IEEE, PI, XP031047322, ISBN: 978-1-4244-0414-8, Oct. 1, 2006, pp. 1-4.

Andrew C. Walker et al., "Design and Construction of an Optoelectronic Crossbar Switch Containing a Terabit per Second Free-Space Optical Interconnect", IEEE Journal of Selected Topics in Quantum Electronics. vol. 5, No. 2, Mar./Apr. 1999, ., pp. 236-249.

Int'l Search Report (Form PCT/ISA/210) conducted in Int'l Appln. No. PCT/EP2020/064516 (Mar. 1, 2021).

Int'l Written OpinionSearch Report (Form PCT/ISA/237) conducted in Int'l Appln. No. PCT/EP2020/064516 (Mar. 1, 2021).

* cited by examiner

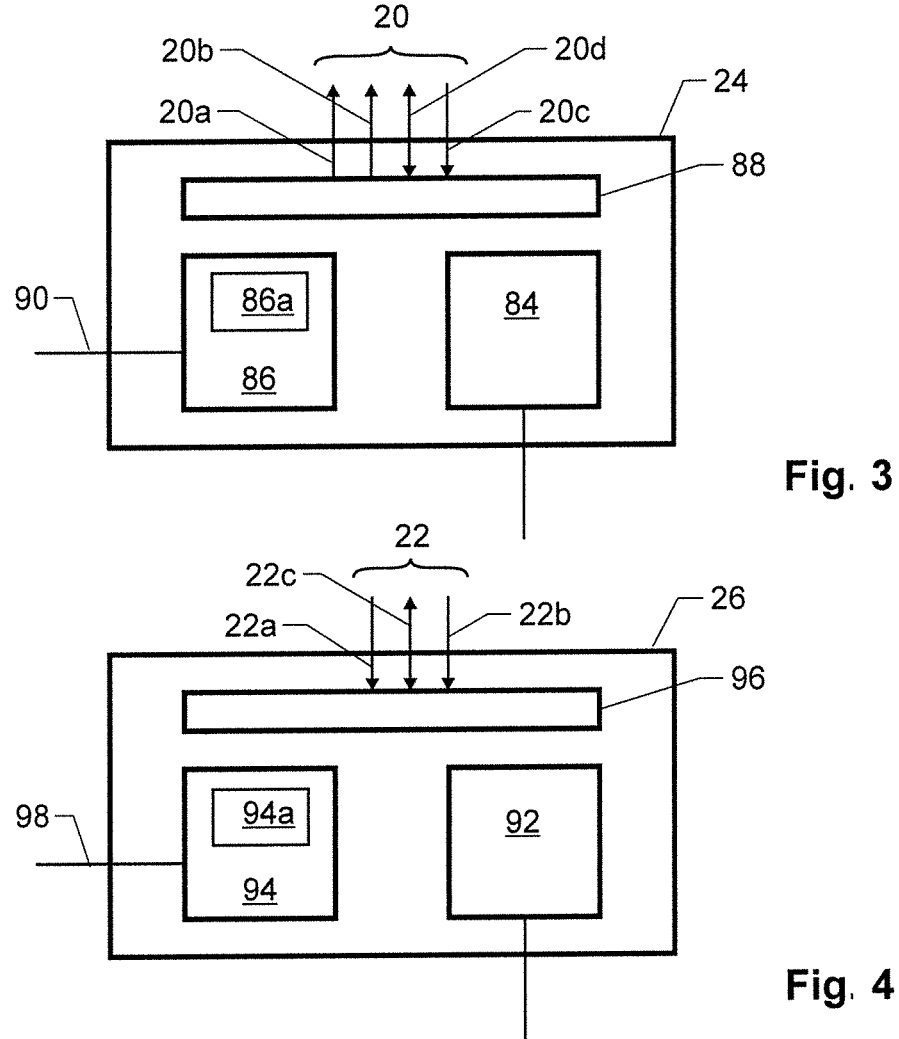
Fig. 3
Fig. 4
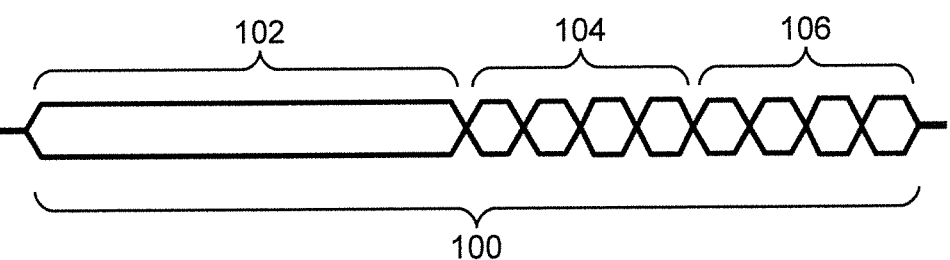
Fig. 5

FAST CONTROLLER DEVICE FOR CONTROLLING A QUANTUM PROCESSOR

TECHNICAL FIELD

The invention relates to a controller device for controlling a quantum process as well as a system comprising such a controller device, to the use of such a controller device or system for controlling a quantum processor, and to a method for operating such a controller device or system.

BACKGROUND ART

A system for controlling a cryogenic quantum processor typically comprises a controller device having a plurality of input channels and output channels, a plurality of qubit readout instruments connected to the input channels, and a plurality of qubit control instruments connected to the output channels.

The qubit control instruments are adapted to send signals into the quantum processor to set up or adjust its state while the qubit readout instruments probe the quantum processor and read out one or more of the qubits at certain times, e.g. for result sampling or error correction.

The controller device provides a feedback block controlling the control instruments in response to the signals measured by the readout instruments. A system of this type is e.g. described by C. A. Ryan et al. "Hardware for Dynamic Quantum Computing", arXiv:1704.08314v1, 28 Apr. 2017. The feedback implemented by the controller device can e.g. be used for state initialization as described in the reference above and/or for Quantum Error Correction (QEC) as e.g. described e.g. by P. Das et al. "A Scalable Decoder Micro-architecture for Fault-Tolerant Quantum Computing", arXiv:2001.06598v1, 18 Jan. 2020.

U.S. Pat. No. 8,035,540 describes a quantum processor architecture with programmable registers.

In order to provide good control for the quantum processor, the controller device should be fast, i.e. the delay time between incoming data from the readout instruments and outgoing instructions to the control instruments should be short in comparison to the time in which the qubits retain their state, the so-called qubit lifetime.

DISCLOSURE OF THE INVENTION

The problem to be solved by the present invention is to provide a fast controller device for controlling a quantum processor.

This problem is solved by the controller device of claim 1.

Accordingly, the controller device comprises at least the following elements:

A plurality of input channels: These channels are adapted and structured to be connected to readout instruments.

A plurality of output channels: These channels are adapted and structured to be connected to control instruments.

An input interface connected to the input channels: The input interface provides at least some of the interfacing tasks towards the input channels, such as interpreting data sent by the readout instruments and feeding this data to the register bank mentioned below.

A register bank: The register bank comprises a plurality of registers connected to the input interface.

A feedback block: The feedback block has inputs connected to the register bank and outputs. It is adapted to calculate the signals at the outputs from the signals at the inputs, e.g. in order to implement state initialization or error correction. It is advantageously programmable by the user.

An output interface: The output interface connects the outputs of the feedback block to the output channels.

According to the invention, the input interface comprises a plurality of address decoders, with different address decoders being attributed to different input channels. The address decoders are adapted and structured to decode register addresses received through their attributed input channel in order to feed data received through the attributed input channel to the addressed register(s). They are advantageously independent in the sense that they can decode addresses concurrently and independently from each other.

This design allows to process the addresses delivered by the input channels in a parallel manner. The invention is i.a. based on the understanding that the routing of data from the readout instruments to the feedback block is a key element of the response time of the controller device. By providing several address decoders, the data from the readout devices can be processed in parallel and routed to the correct registers for buffering and providing it for the feedback block to process.

There may be an individual address decoder for each input channel in order to provide parallel processing for all input channels.

Advantageously, each address decoder is part of an update decoder, with different update decoders being attributed to different input channels. Each update decoder is adapted and structured to decode update messages from its input channel. Each such update message comprises:

Address data indicative of at least one register in the register bank: This address data specifies the register(s) for storing the data.

At least one data value indicative of the value to be stored in the register(s) specified by the address data: This is the data read out by the readout instrument and to be provided to the feedback block.

At least one validity bit indicative of the validity of the data value: This bit specifies if the given data value is valid or not. If it is not valid, there is no need to update the value stored in the specified register and/or to process the data value by the feedback block.

The update decoder may, in this case, further comprise

An address output: The address output is indicative of (i.e. it represents) the address data. Advantageously, the address output is a parallel output with one output line for each bit of the address data.

A first data output: The first data output is indicative of (i.e. it represents) the data value.

A first validity output: The first validity output is indicative of (i.e. it represents) the validity value.

Hence, there is an address output, a data output, and a validity output for each update decoder, i.e. these outputs are provided in parallel for several input channels.

Each update message may comprise several data values and several validity bits. In this case, each validity bit is indicative of the validity of one of the data values. This allows to transfer several data values with one instance of the address data while still providing the option to individually specify the validity of each data value. Since the address data typically comprises a large number of bits, such as at least seven bits, this allows to reduce the amount of bits to be transferred if the readout instrument needs to transfer several data values at a time.

In that case, the address data does not necessarily have to individually and explicitly specify the register for each data value. In other words, if N is the bit length of the address data, the following condition is advantageously met:

$$2^N < R \cdot P, \tag{1}$$

wherein R is the number of the registers in the register bank and P is the number of the data values in one update message.

In particular, $2^N \leq R$, i.e. the address data has sufficient length to identify each one of the registers, or it may even be shorter. As described in more detail below, the addresses of all registers for the data values can still be inferred from the address value.

The controller device may e.g. be adapted to automatically calculate the addresses of all registers to be changed based on the address data e.g. by using fixed offsets starting from the address of a base register as specified by the address data.

The update decoder may comprise a first data output for each data value and a first validity output for each validity bit.

Each update decoder may further comprise a mask generator. Each mask generator comprises, for each of the registers of the register bank:

A second data output indicative of the data value to be stored in the given register: This represents the value that has to be stored in the register (if the second validity output mentioned below indicates the value to be valid).

A second validity output indicative of there being valid data for the given register: Only if this output is active, the data value has to be stored in the given register.

By providing several such mask generators attributed to different update decoders, the second validity outputs and the second data outputs can be calculated in parallel for the respective update decoders.

In the case where the above condition (1) is met, the mask generator is advantageously structured and adapted to identify, from the address data of an update message, a subset of more than one register and then to feed the data values of the same update message to the second data outputs attributed to the registers in this subset.

The controller device may further comprise a plurality of register update selectors. Each register update selector is connected to one register. It is furthe connected to the second data outputs and the second validity outputs of the mask generators, namely to those second data outputs and second validity outputs for the one register the register update selector is connected to.

Hence, the controller device provides parallel data flows between the input channels and the mask generators, and these data flows are then combined, for a given register, by the register update selector of this register.

In order to handle error conditions, the register update selector May be adapted to generate an error message, e.g. on an error output thereof, if more than one of the second validity outputs it is connected to indicates the presence of valid data. This allows to e.g. detect errors in the programming of the readout instruments.

The invention also relates to a system for controlling a quantum processor comprising such a controller device. This system further comprises A plurality of qubit readout instruments connected to the input channels of the controller device: The readout instruments may comprise the circuitry to read one single qubit or combinations of qubits from the quantum processor and to convert them into measurement data.

Optionally: A plurality of qubit control instruments connected to the output channels: The control instruments may comprise circuitry to control the qubits of the quantum processor.

In this case, each readout instrument may comprise at least one memory for storing the address to be transmitted as address data on the input channel connecting the readout instrument to the controller device. This allows the readout instruments to be programmed to specify the address of the register(s) where the measured data (corresponding to the transmitted data value(s)) is/are to be stored.

The controller device may comprise at least one FPGA, i.e. a programmable gate array. This one or more FPGA may form at least one of the following parts of the controller device, in particular all of said parts:

a) The input interface.
b) The register bank.
c) The feedback block.
d) The output interface.

The invention also relates to the use of such a controller device or system for controlling a quantum processor.

Further, the invention also relates to a method for operating the controller device or the system as described above, with said method comprising the step of operating several of the address decoders in parallel (i.e. concurrently, i.e. in temporally at least overlapping manner) for decoding address data from several input channels.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 3 is a more detailed view of an embodiment of a readout instrument, and

FIG. 4 is a more detailed view of an embodiment of a control instrument,

FIG. 5 shows an example of a serialized update message, and

MODES FOR CARRYING OUT THE INVENTION

Overview

Figure 1:
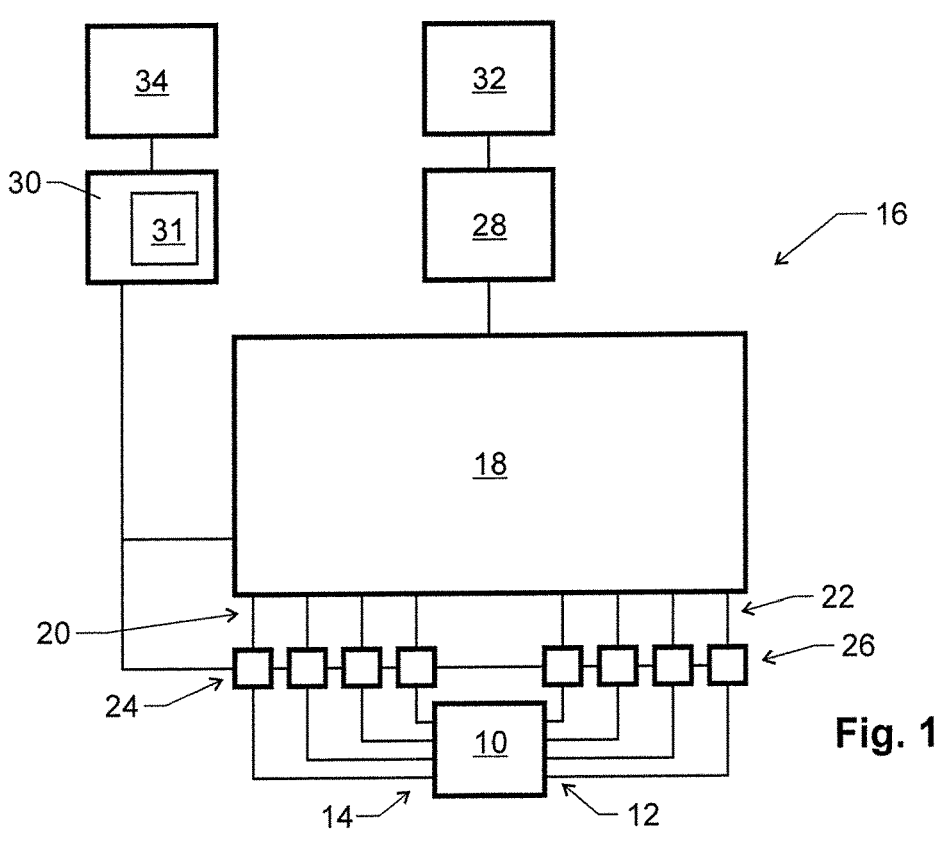
FIG. 1 shows a general overview of an embodiment of the system.

FIG. 1 shows an overview of an embodiment of a system for controlling a quantum processor 10.

Quantum processor 10 may be implemented in any suitable quantum processor technology. It has a first plurality of interacting qubits, a second plurality of inputs 12 for setting the states of the qubits, and a third plurality of outputs 14 for detecting the states. Typically, the first, second, and third pluralities will differ in numbers.

The system 16 has the purpose to set the qubits, to sample the qubits, and/or to control the cubits, e.g. for setting up the state of the cubits, for reading results from quantum processor 10, or for error correction in QEC scheme as mentioned above.

System 16 comprises a controller device 18 having a plurality of input channels 20 and a plurality of output channels 22. FIG. 1 and the following examples show four of each of these channels, but that number will, in most applications, typically be larger, and the numbers of input channels and output channels will typically differ.

The outputs 14 of quantum processor 10 are connected to qubit readout instruments 24, and each readout instrument 24 is connected to controller device 18 by means of at least one of the input channels 20.

Typically, each readout instrument 24 generates pulses to be fed to quantum processor 10 (not shown in the figures) and then measures the response at the outputs 14.

The output channels 22 of controller device 18 are connected to qubit control instruments 26, and each control instrument 26 is connected to at least one of the inputs 12 of quantum processor 10.

Again, there may be any suitable numbers of readout instruments 24 and the control instruments 26.

The system may further comprise an FPGA configuration device 28 for configuring a user-configurable section of controller device 18.

It may also comprise a system configuration device 30 connected to the readout instruments 24, the control instruments 26, and/or the controller device 18 and adapted to program them as described in more detail below.

The system may further e.g. comprise a first higher-level controller device 32 for controlling FPGA configuration device 28 and/or a second higher-level controller device 34 for controlling system configuration device 30.

In operation, controller device 18 controls and synchronizes the control instruments 26 for setting up and/or correcting the qubit states of quantum processor and the readout instruments 24 for obtaining signals. FPGA controller device 28 controls the setup of the feedback logics between the input channels 20 and the output channels 22. System configuration device 30 controls the operating parameters of the readout instruments 24 and the control instruments 26 as well as the process control incorporated in controller device 18.

Possible designs and functionalities of some of the individual components will be described in more detail in the following sections.

Controller Device

Figure 2:
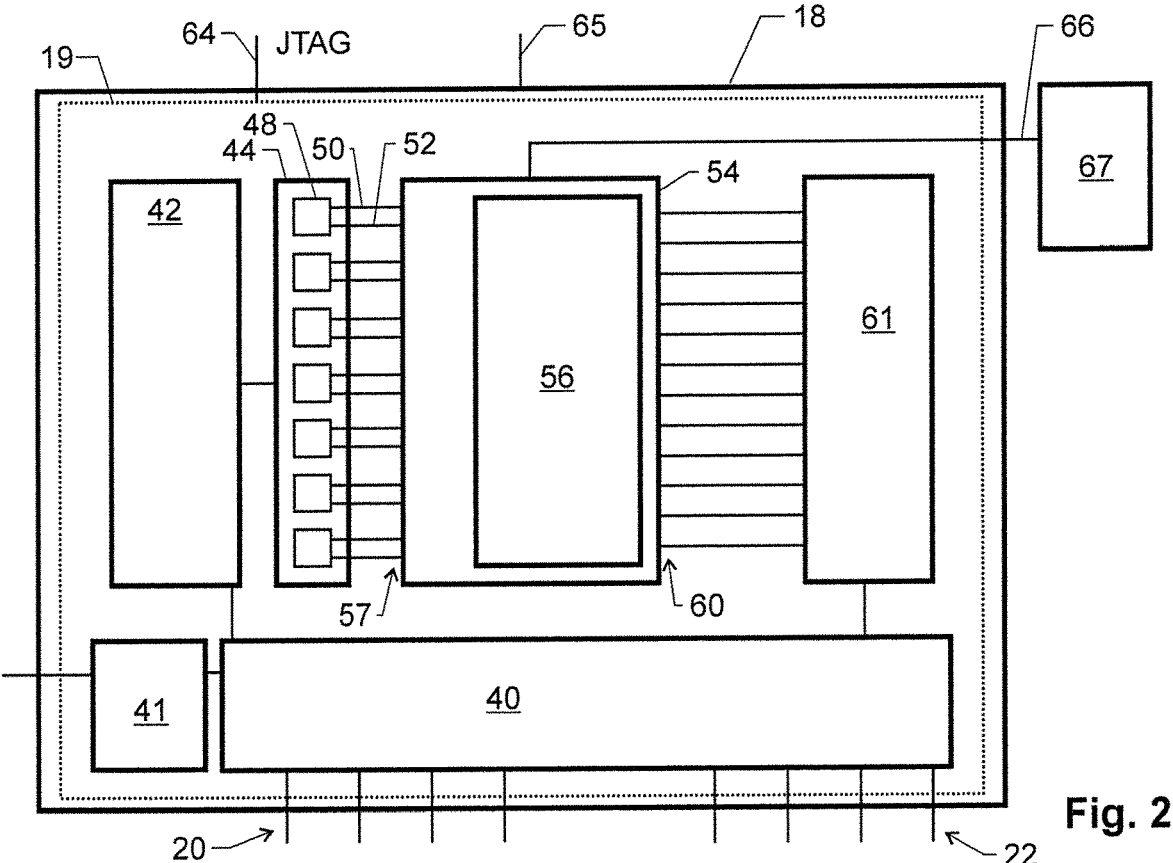
FIG. 2 is a more detailed view of an embodiment of the controller device.

FIG. 2 shows a more detailed view of an embodiment of controller device 18.

Typically, controller device 18 is implemented, at least in part, as an FPGA 19, for the high speed, high degree of parallelism, and the well-defined delay time of such FPGA circuitry.

In particular, it comprises a communication and synchronization section 40, which forms the low-level interface for the input channels 20 and the output channels 22. In particular, it may serialize and deserialize data, it feeds a common, global clock signal to each channel 22, 20, and it handles synchronization signals at each channel 22, 20 and/or may trigger the storage of data in the registers 48.

Communication and synchronization section 40 may also comprise an experiment controller 41 to control a series of experiments. Experiment controller 41 may be adapted to operate the control instruments 26 and the readout instruments 24 over a series of control and readout cycles of quantum processor 10 as a function of experiment flow data provided by system configuration device 30.

As will be described below, the input channels 20 carry update messages with address data, measurement data, and validity bits.

These update messages are fed to an input interface 42, which interprets them and sends control data to register bank 44 as described in more detail below.

As above, even though FIG. 2 and the following examples show eight registers 48, this is for illustration purposes only. The actual number of registers in a device may be different and will typical be larger. Typically, there is a least one register per qubit of quantum processor 10. Typically, there are at least 7 registers, in particular at least 100 registers.

Each register 48 has two outputs:

A "data output" 50 carries a signal indicative of the value stored in the register, e.g. a logical 1 if the register stores a 1-value and a logical 0 if the register stores a 0-value.

A "new value output" 52 carries a signal indicative of a write event of new data into the register. A "write event" is a write operation generated by an input channel 20 sending data to the respective register even if the actual value of the register is not changed by the operation. In other words, each new value output 52 flags the occurrence of a write operation in its register 48. The new value output may e.g. be a binary signal set into an "on" state upon a write operation and reset e.g. after the feedback block (to be described below) has calculated its output values. Alternatively, and typically, the new value output may be reset after a predefined time interval, typically one clock cycle. The new value outputs 52 may be used to selectively re-calculate the outputs of feedback block 54 when new data is present.

An embodiment for implementing the circuitry generating data output 50 and new output 52 is shown below.

Register bank 44, i.e. the data outputs 50 and the new value outputs 52, is connected to a programmable feedback block 54.

In the shown embodiment, feedback block 54 is embodied as logic circuitry in the FPGA and implements the algorithm used to generate the values for the output channels 22 from the values in register bank 44. It will be described in more detail below. In one embodiment, it may e.g. comprise a lookup table 56 as shown.

Feedback block 54 comprises inputs 57 connected to register bank 44.

The outputs 60 of feedback block 54 (which also form the inputs of output interface 61) are connected to an output interface 61, where they are converted to signals to be fed via communication and synchronization section 40 to the output channels 22.

Advantageously, each output 60 is a one-bit or multibit value to be transmitted to a specific control instrument 26. Output interface 61 is adapted to send each one of these values to their respective control instrument 26 via one of the output channels 22.

Controller device 18 may further comprise a JTAG interface 64 for low-level access to its FPGA circuitry 19 and a control interface 65 for being connected to FPGA configuration device 28.

Controller device 18 may also comprise an interface 66 for connecting feedback block 54 to external circuitry, such as a coprocessor 67. Interface 66 may e.g. be a PCI or AXI bus.

Coprocessor 67 may comprise optimized hardware for fast numerical processing and may e.g. be a GPU or a processor dedicated to other types of processing, such as a Versal™ coprocessor by Xilinx Inc. This physical coprocessor may be implemented in the same chip as the FPGA, on the same PCB as the FPGA, or on another PCB.

FPGA Configuration Device

FPGA configuration device 28 is typically a computer device running software that is configured to receive a "feedback block definition" and to program a section of the FPGA 19 of controller device 18 accordingly.

The section of controller device 18 that it programs typically corresponds to feedback block 54 or comprises feedback block 54.

Advantageously, configuration device 28 is adapted to provide different modes, with the different modes being adapted to program different algorithms into feedback block 54 for connecting the registers 48 to the outputs 60 of feedback block 54. Depending on the task to be achieved, the user can employ one or more of these modes for implementing feedback block 54.

These modes may e.g. include one or more of the following:

LUT-mode: In this mode, configuration device 28 is adapted to program feedback block 54 to form a lookup table (LUT) storing a plurality of coefficients. The lookup table comprises a selection input connected to register bank 44 (i.e. to the data outputs 50 of the registers 48) and a result output connected to output interface 61.

ML-mode: Configuration device 28 may comprise an "ML-mode". In this mode, it is adapted to program feedback block 54 as a machine learning model, e.g. in cooperation with coprocessor 67. Various suitable models of this type are known to the skilled person, in particular artificial neural networks. Other models, though, may be used as well, in particular support vector machines, and/or also decision trees, regression analyzers, Bayesian networks, or genetic algorithms.

FPGA direct programming mode: Configuration device 28 may comprise an "FPGA direct programming mode". In this mode, the user may specify gate-level FPGA instructions, e.g. VHDL instructions, for programming the section of the FPGA 19 corresponding to feedback block 54.

Coprocessor programming mode: Configuration device 28 may comprise a "coprocessor programming mode". In this mode, it is adapted to program feedback block 54 to send data derived from at least part of the registers 48 to coprocessor 67 for processing and to receive at least some of the results back from coprocessor 67 and send them to output interface 61.

Routing mode: Configuration device 28 may comprise a "routing mode". In this mode, it connects individual registers 48 to one or more of the outputs 60. The control instruments 26 may e.g. then use this for performing a conditional execution of waveform generation during qubit state preparation of quantum processor 10.

Boolean mode: Configuration device 28 may comprise a "Boolean mode". In this mode, it connects at least some of the registers 48 to at least some of the outputs 60 using Boolean operations, e.g. setting a given output to 1 only if two given registers have values of 1.

Optimization mode: Configuration device 28 may comprise an "optimization mode". In this mode, it programs at least part of the feedback block 54 (optionally with the help of coprocessor 67) to form a numerical optimizer, i.e. a numerical minimizer or maximizer, for finding a minimum or maximum of a function depending on a plurality of values, in particular on at least some register values.

Configuration device 28 may be adapted to structure feedback block 54 only. But may e.g. also be adapted to structure register bank 44 and/or input interface 42 and/or output interface 61.

In one embodiment, configuration device 28 may be configured to merge the feedback block definition(s) 68 with e.g. VHDL definitions describing the circuitry of at least input interface 42, register bank 44, and output interface 61 in order to generate FPGA configuration data of at least part or the whole FPGA circuitry 19 of controller device 18.

Readout Instruments

FIG. 3 shows an embodiment of a qubit readout instrument 24. It comprises qubit interface circuitry 84 for interfacing with quantum processor 10, e.g. comprising analog circuitry and at least one A/D converter. It further comprises a control section 86 as well as an interface section 88.

Interface section 88 is adapted to communicate through at least one of the input channels 20, which includes a (logical or physical) sub-channel 20*a* for the address data and a sub-channel 20*b* for the measurement data.

Each input channel 20 advantageously also comprises a system clock line 20*c* with a master clock common to all readout instruments 24 and all control instruments 26 as well as a synchronization sub-channel 20*d* providing a common time base to all readout instruments 24 and all control instruments 26.

Each input channel 20 advantageously also provides handshake functionality. In particular, it may carry a 'ready signal' indicative of the fact that the instrument is ready for new instructions.

Control section 86 comprises at least one memory 86*a* for storing at least one address of a register the measurement data is to be sent to. Memory 86*a* may also store further operating instructions.

Readout instrument 24 may also comprise a configuration input 90 connected to system configuration device 30. In particular, readout instrument 24 may be adapted to receive instructions through configuration input 90 for changing the address and/or operating instructions in memory 86*a*. This is described in more detail below.

Advantageously, readout instrument 24 may be adapted to test one or more qubits from quantum processor 10 and, if they fulfill a certain condition, to write data into one or more specific registers.

Suitable programming can be entered into storage 86*a* through configuration input 90.

Control Instruments

FIG. 4 shows an embodiment of a qubit control instrument 26. It comprises qubit interface circuitry 92 for interfacing with quantum processor 10, e.g. comprising at least one D/A converter and analog circuitry. It further comprises a control section 94 as well as an interface section 96.

Interface section 96 is adapted to communicate through one of the output channels 22, which includes a (logical or physical) sub-channel 22*a* for the data from feedback block 54.

Each output channel 22 advantageously also comprises a system clock line 22*b* with the master clock common to all readout instruments 24 and all control instruments 26 as well as a synchronization sub-channel 22*c* providing a common time base to all readout instruments 24 and all control instruments 26.

Output channel 22 may e.g. be adapted to transmit multibit values to each control instrument 26.

Each output channel 22 advantageously also provides handshake functionality. In particular, it may carry a 'ready signal' indicative of the fact that the instrument is ready for new instructions.

Control section 94 comprises at least one memory 94a for storing configuration data.

Control instrument 26 also comprises a configuration input 98 connected to system configuration device 30 as described below. In particular, control instrument 26 may be adapted to receive instructions through configuration input 90 for changing its operating instructions.

Advantageously, control instrument 26 may be adapted to test bits in the multibit value it received through its output channel 22 and to conditionally generate specific waveforms by means of interface circuitry 92.

Suitable programming can be entered into storage 94a through configuration input 98.

System Configuration Device

System configuration device 30 is adapted to program the readout instruments 24 and the control instruments 26, i.e. to change the settings in their memories 86a and 94a.

In the embodiment of FIG. 1, system configuration device 30 is connected to the configuration inputs 90 and 98. However, it may also communicate with the readout instruments 24 and the control instruments 26 through controller device 18.

Further, in the shown embodiment, system configuration device 30 is also connected to controller device 18 for controlling experiment controller 41 (see FIG. 2).

System configuration device 30 may comprise a system compiler 31 adapted to convert an (e.g. textual) experiment description into a configuration to be sent to the readout instruments 24, control instruments 26, and/or controller device 18. The experiment description may e.g. specify at least one, in particular several, of the following experimental settings:

pulse shapes to be generated by the control instruments 26, pulse sequences to be generated by the control instruments, optionally as synchronized by experiment controller 41, pulse times of the pulses generated by the control instruments 26, readout times for the readout instruments 24, register addresses for the data values from the readout instruments 24.

System configuration device 30 may then e.g. modify the experiment and then order experiment controller 41 to execute another series of control and readout cycles.

System configuration device 30 may be agnostic towards the specific configuration of feedback block 54.

Advantageously, though, system configuration device 30 is provided with at least "delay information" describing the delay between the input channels 20 and the output channels 22, which may depend on the configuration of feedback block 54. This e.g. allows to synchronize the operations of the control instruments 26 with the ones of the readout instruments 24, obviating the need of "wait" operations in the control instruments 26.

In one example, system configuration device 30 may be adapted to receive an experiment description for a given control instrument 26. A (non-limiting) example of such an experiment description for a certain control instrument 26 may e.g. look like this:

if (condition [4]) playWave (A);
else playWave (B);

When compiling these instructions, configuration device 30 transmits programming to memory 94a of the given control instrument 26, which, when being executed by the control instrument 26, makes it test bit 4 of the value it received through its output channel 22. If said bit is 1, it causes its interface circuitry 92 to play a first waveform A, otherwise a second waveform B.

In another illustrative example, system configuration device 30 may be adapted to receive an experiment description for a given readout instrument 24 e.g. as follows:

measure(qubits={0,1,1,0}, reg={0x10});

When compiling these instructions, configuration device 30 transmits programming to memory 86a of the given readout instrument 24, which—when executed by the readout instrument—makes it read out qubits 1 and 2 of the available four qubits 0 . . . 3. It then sends the two e.g. binary readout results, together with a base register address 0x10 and a series of validity bits (see below), through its readout channel 20 to controller device 18, which causes the result to be written into the register with address 17 and 18 in register bank 44 and the respective new data signals are strobed.

To do so, readout instrument 24 may generate, on its input channel 20, a serial signal comprising an update message 100 as shown in FIG. 5.

This signal comprises address data 102, data values 104 and validity bits 106.

Address data 102 is an address (e.g. of seven bits) e.g. specifying a base address of registers to be used.

The data values 104 comprise e.g. the four data values the readout instruments is able to measure. Each data value may be a one bit value or a multibit value. In most embodiments, each data value is a one bit or a two bit value.

Further, update message 100 comprises one validity bit 106 for each data value 104. It indicates if the respective data value 104 is valid. In the example above, where qubits 1 and 2 of the available qubits 0, 1, 2, and 3 are measured, only the second and third data value 104 is valid and, therefore, the validity bits will be 0, 1, 1, and 0, respectively.

The validity bits 104 and the address data 102 can be stored in memory 86a of the given readout instrument.

Input Interface

Figure 6:
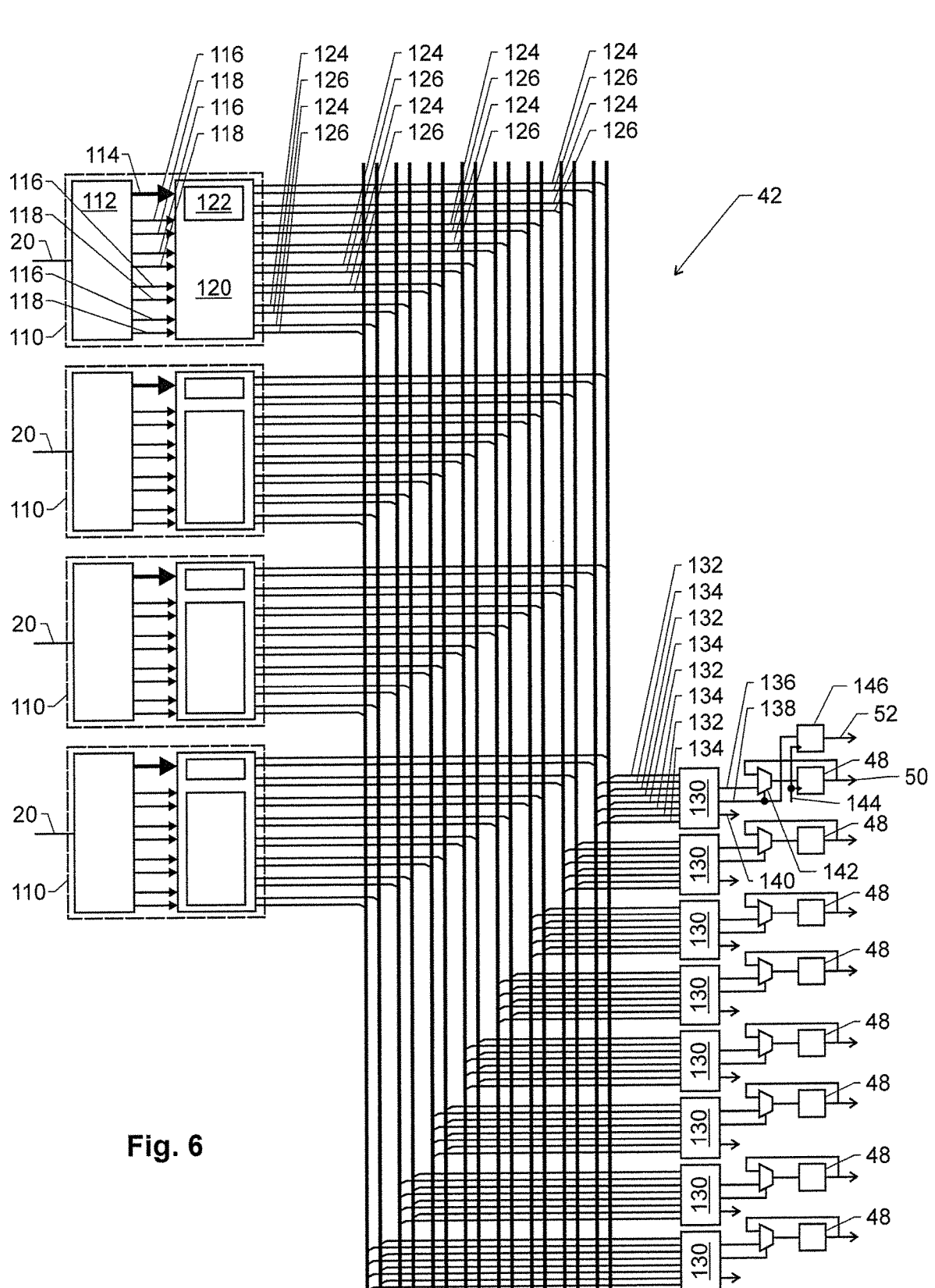
FIG. 6 shows an embodiment of an input interface 42.

FIG. 6 shows an embodiment of an input interface 42. In this example, it is assumed that the number K of input channels is 4, the number P of data values and validity bits in the update messages 100 is also 4, and the number R of registers 48 is 8.

In practice, these values may be different. Typically, the number R of registers 48 will be at least 100, e.g. 128, and the number K of input channels is e.g. at least 10.

Note: Fat lines in FIG. 6 denote bundles of parallel lines.

As can be seen, input interface 42 comprises, for each input channel 20, an update decoder 110. The update decoders 110 are adapted and structured to operate in parallel in order to decode the update messages 100 with a high throughput.

In the shown embodiment, each update decoder 110 comprises a deserializer 112 (which may also be implemented e.g. as part of communication and synchronization section 40—in that case, the respective parts of communication and synchronization section 40 are considered to form part of the update decoders 110).

Deserializer 112 decodes the serial bit stream of update message 100 and provides the address data 102 of update message 100 on an address output 114 as a binary value, the data values 104 of update message 100 on first data outputs 116, and the validity bits 106 of update message 100 on first validity outputs 118.

Each address output 114 comprises a number of bits equal to the number of bits in address data 102, each first data output 116 comprises a number of bits equal to the number of bits in each data value 104, and each first validity output 118 is e.g. a one-bit output.

In each update decoder 110, the address output 114, the first data output 116 and the first validity output 118 are fed to mask generator 120.

Mask generator 120 has, for each of the registers 48, the following outputs A second data output 124: This output carries the data value to be stored in said register 48. This may be a one bit or multi-bit output, typically a one or two bit output. Each mask generator 120 has N second data outputs 124.

A second validity output 126: This output indicates if there is valid data for said register 48. This is a single bit output. Each mask generator 120 has N second validity outputs 126.

Mask generator 120 comprises an address decoder 122, which decodes the address data 102. For example, it takes the value of the address in the address data and translates it into an array of bits, with each bit corresponding to one register. The bit(s) of the register(s) specified by the address data 102 will be active (e.g. 1), while the other bits will be inactive (e.g. 0).

Each update decoder 110 identifies, from the address data it receives in an update message 100 on its input channel 20, a number P of registers that the P data values 104 are to be forwarded to.

For example, address data 102 may identify the number of only one specific register 48, such as the register having address X. In that case, update decoder 110 assumes that the first data value 104 is to be stored in the register having address X, the second data value 104 is to be stored in the register having address X+1, the third data value 104 is to be stored in the register having address X+2, etc.

In more general terms, address data 102 may specify the address of a base register and update decoder 110 may be structured to store the data values 104 in registers in an address block starting with the address of the base register.

In that case, if any register can be the base register, the bit length N of the address data must be such that $$2^N = R, \tag{2}$$

with R being the number of registers.

However, if only a subset of the registers can act as a base register, e.g. only the registers at addresses 0x00, 0x04, 0x08, 0x0C, 0x10, etc., then the bit length N of the address data may even be smaller, i.e.

$$2^N < R. \tag{3}$$

In the above examples, if there are 128 registers, N is e.g. 7 in the example of Eq. (2) and 5 in the specific example for Eq. (3).

As further shown in FIG. 6, the controller device further comprises a plurality of register update selectors 130. Each such register update selector 130 is connected to one of the registers 48.

Each register update selector 130 comprises two types of inputs:

Several data inputs 132: There are K such data inputs 132, with K being the number of input channels. Each data input 132 is connected to the second data output 124 of the mask generator 120 for the respective input channel.

Several validity inputs 134: There are again K such data inputs 132. Each validity input 132 is connected to the second validity output 126 of the mask generator 120 for the respective input channel.

Register output selector 130 is structured to analyze the second validity outputs 126 attributed to its register and to detect if one of them indicates the corresponding data value to be valid. If one of these second validity outputs 126 does indicate its data value to be valid, register output selector 130 updates its register 48 accordingly with said data value.

For this purpose, each register output selector 130 may comprise the following outputs:

A third data output 136: It carries the data value from the input channel for which the second validity output indicates that the second data output contains valid data.

A third validity output 138: It is active (e.g. 1) if at least one, in particular exactly one, of the second validity outputs for the given register was active, and it is inactive otherwise.

An optional error output 140: It carries an error message (error bit) if more than one of the second validity outputs 126 for the given register 48 indicates its value to be valid. This error message can e.g. be used by the system, such as configuration device 30 or controller device 34, to detect an error in the programming of the readout instruments 24.

Register update circuitry can be used to update register 48 depending on the third data output 136 and the third validity output 138.

For example, such update circuitry may comprise a multiplexer 142 that either feeds the output of register 48 or the third data output 136 to the input of register 48. Third validity output 138 is used as a selector input to multiplexer 142. Register 48 may e.g. be clocked for updating its value by a clock signal on a clock input 144 generated by communication and synchronization section at times when the signals at the third data output 136 and the third validity output 138 are stable.

In addition, a new-value-register 146 may be provided to store the value of the third validity output 138 in order to generate the "new value output" 52 as mentioned above. New-value-register 146 may also be clocked by clock input 144. (for simplicity, FIG. 6 shows a new-value-register 146 for one of the registers 48 only, but there is advantageously one new-value-register 146 for each register 48.)

In general, the bits in the update messages 100 on the input channels 20 are synchronous with a global system clock, and the de-serialization of said update messages is also synchronous with this global system clock. Also, the triggering of the registers 48 is synchronous with this global system clock.

On the other hand, the operation of the mask generators 120, the address decoders 122, and/or the update selectors 130 may be asynchronous.

The time for updating the registers 48 may be chosen according to the delay of the signals propagating through the mask generators 120, the address decoders 122, and the update selectors 130.

System Architecture

Advantageously, the readout instruments 24 and the control instruments 26 are devices separate from controller device 18. Advantageously, the channels 22 and 20 are serial channels for simpler connection.

Also, FPGA configuration device 28 is advantageously a device separate from controller device 18, e.g. a regular computer or dedicated hard- and software.

Also, system configuration device 30 is advantageously a device separate from controller device 18 and also separate from the instruments 24, 26. It may e.g. also be a regular computer or dedicated hard- and software.

FPGA configuration device 28 and system configuration device 30 may be separate devices or implemented as a common device.

Advantageously, two devices are considered to be "separate" if they are connected by user-separable plug-in connectors only and/or if they are connected by a plug-in bus system, such as by a PXI backplane.

Notes

The term "system" as used herein denotes an apparatus with hardware as well as suitable software to be adapted and structured to carry out the functionality described.

The present system allows the user to specify the feedback block definition(s) 68 only, without having to specify the configuration of the rest of the FPGA circuitry 19 implemented by controller device 18, which greatly simplifies the task of configuring the controller device 18.

In other words, the FPGA configuration device 28 is advantageously adapted to receive information (through feedback block definition 68) specifying the configuration of feedback block 54 only and then to configure the FPGA(s) 19 of controller device 18 to implement not only feedback block 54 but also at least input interface 42, register bank 44, and output interface 61. It may e.g. do this by merging the feedback block definition(s) 68 with FPGA configuration data implementing the parts 42, 44, and 61 and then reprogramming the whole FPGA 19, and/or by reprogramming the feedback block 54 of the FPGA(s) 19 while leaving the FPGA parts implementing the input interface 42, register bank 44, and output interface 61 unchanged.

As mentioned above, the data values may e.g. be one bit values, e.g. indicating the state of a given qubit. They may e.g. also be two bit values, which e.g. allows to encode parasitic qubit states. Longer data values may be used as well. Accordingly, the registers 48 may be one bit or multi bit registers.

Data compression may be used to co-encode the data values and the validity bits. For example, if the data values can have three different states, the validity bit may be co-encoded with the data value into only two bits, e.g. with 00, 01, and 10 indicating valid data values and 11 indicating an invalid data value. This e.g. allows to reduce the length of update message 100 or to use the same physical leads for the (first, second, and/or third) data outputs and the (first, second, and/or third) validity output.

While there are shown and described presently preferred embodiments of the invention, it is to be distinctly understood that the invention is not limited thereto but may be otherwise variously embodied and practiced within the scope of the following claims.

The invention claimed is:

1. A controller device for controlling a quantum processor comprising:

a plurality of input channels, a plurality of output channels, an input interface connected to said input channels, a register bank comprising a plurality of registers connected to said input interface, a feedback block having inputs connected to said register bank and outputs, an output interface connecting the outputs of the feedback block to the output channels, wherein said input interface comprises a plurality of address decoders, with different address decoders being attributed to different input channels, wherein each address decoder is part of an update decoder, with different update decoders being attributed to different input channels, wherein said update decoder is adapted and structured to decode update messages from its input channel, with each update message comprising:

address data indicative of at least one register in the register bank, at least one data value indicative of a value to be stored in the register indicated by the address data, at least one validity bit indicative of a validity of said data value.

2. The controller device of claim 1, comprising one address decoder for each input channel.

3. The controller device of claim 1, wherein said decoder comprises an address output indicative of said address data, a first data output indicative of said data value, and a first validity output indicative of said validity bit.

4. The controller device of claim 1, wherein each update message comprises several data values and several validity bits, wherein each validity bit is indicative of the validity of one of the data values.

5. The controller device of claim 4, wherein $$2^N < R \cdot P,$$

wherein N is a bit length of said address data, R is a number of said registers in the register bank, and P is a number of the data values in one update message.

6. The controller device of claim 5, wherein $2^N \leq R$.

7. The controller device of claim 5, wherein each update decoder comprises a mask generator, which mask generator comprises, for each of said registers, a second data output indicative of the data value to be stored in said register and a second validity output indicative of there being valid data for said register, wherein said update decoder is structured and adapted to identify, from the address data, a subset of more than one register and to feed the data values to the second data outputs attributed to the registers in the subset.

8. The controller device of claim 1, wherein each update decoder comprises a mask generator, which mask generator comprises, for each of said registers, a second data output indicative of the data value to be stored in said register and a second validity output indicative of there being valid data for said register.

9. The controller device of claim 8, further comprising a plurality of register update selectors, wherein each register update selector is connected to one register and to the second data outputs and second validity outputs for said one register.

10. The controller device of claim 9, wherein each of said register update selectors is adapted to generate an error message if more than one of the second validity outputs it is connected to indicates the presence of valid data.

11. A method of operating the controller device of claim 1 for controlling the quantum processor, the method comprising:

decoding update messages from attributed input channels of the update decoder, wherein each update message comprises:

address data indicative of at least one register in the register bank, at least one data value indicative of a value to be stored in the register indicated by the address data, at least one validity bit indicative of a validity of said data value.

12. A method for operating the controller device of claim 1 comprising operating several of said address decoders in parallel for decoding address data from several input channels.

13. A system for controlling a quantum processor comprising:

a controller device that includes:

a plurality of input channels, a plurality of output channels, an input interface connected to said input channels, a register bank comprising a plurality of registers connected to said input interface, a feedback block having inputs connected to said register bank and outputs, an output interface connecting the outputs of the feedback block to the output channels, wherein said input interface comprises a plurality of address decoders, with different address decoders being attributed to different input channels, and a plurality of qubit readout instruments connected to the input channels, wherein each readout instrument comprises at least one memory storing an address to be transmitted as address data on the input channel connecting the readout instrument to the controller device.

14. The system of claim 13, further comprising a plurality of qubit control instruments connected to the output channels.

* * * * *